March 14, 1950 L. OLIVER 2,500,562
CENTRIFUGALLY OPERATED MECHANISM
Filed June 11, 1943 3 Sheets-Sheet 1

LOCKWOOD OLIVER
INVENTOR.

BY Hawgood & Van Horn his ATTORNEYS

March 14, 1950 — L. OLIVER — 2,500,562

CENTRIFUGALLY OPERATED MECHANISM

Filed June 11, 1943 — 3 Sheets-Sheet 2

LOCKWOOD OLIVER
INVENTOR.

BY Hangood & VanHorn

His ATTORNEYS

March 14, 1950     L. OLIVER     2,500,562
CENTRIFUGALLY OPERATED MECHANISM
Filed June 11, 1943     3 Sheets-Sheet 3
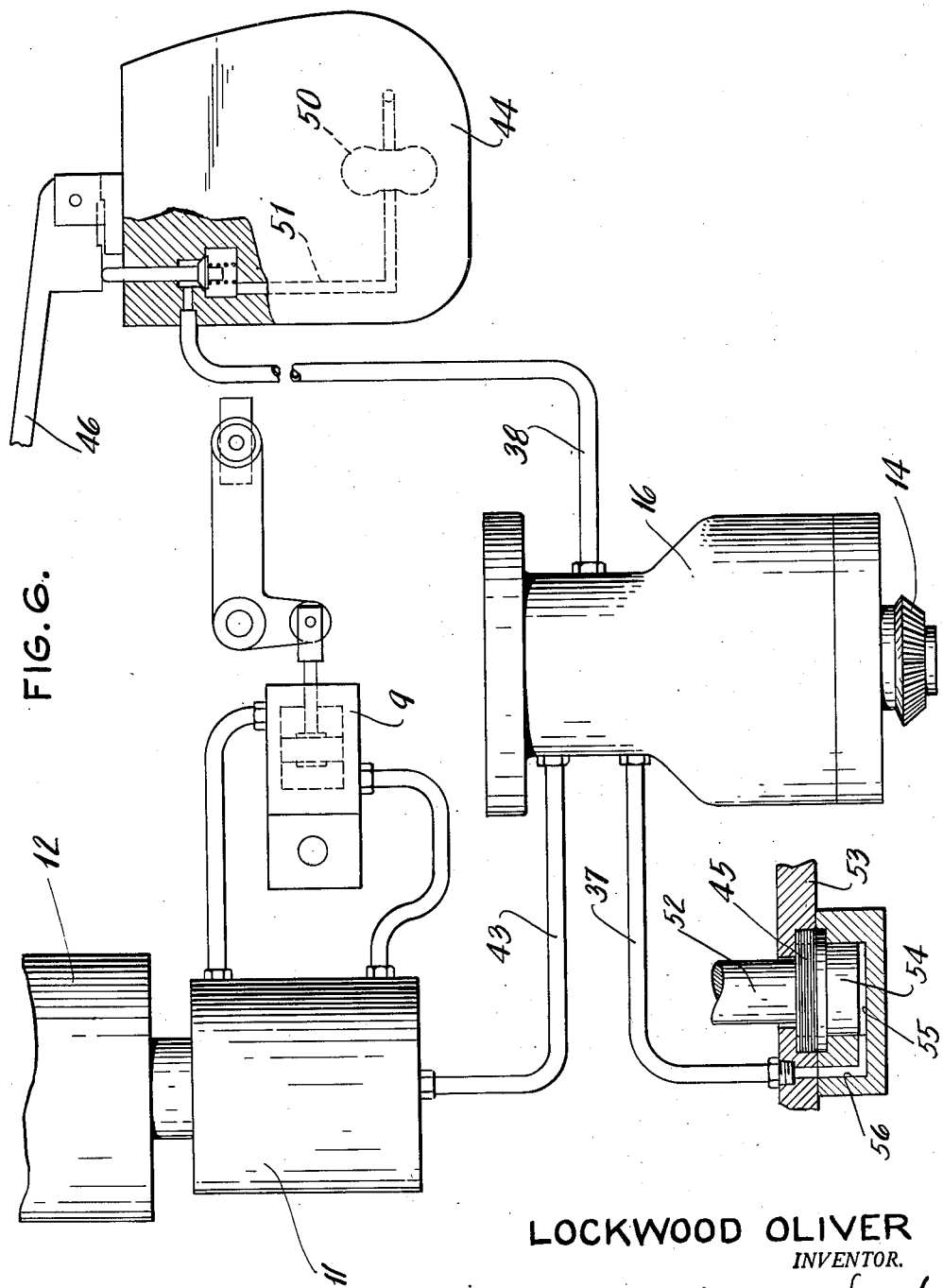
LOCKWOOD OLIVER
*INVENTOR.*

Patented Mar. 14, 1950

2,500,562

UNITED STATES PATENT OFFICE 2,500,562

CENTRIFUGALLY OPERATED MECHANISM

Lockwood Oliver, Hudson, Ohio, assignor to Bardons and Oliver, Inc., Cleveland, Ohio, a corporation of Ohio Application June 11, 1943, Serial No. 490,544

10 Claims. (Cl. 192—4)

My invention is an improvement in hydraulic controls and relates more particularly to a control system including a centrifugally operated valve and one or more operable units controlled by said valve.

The present invention has for one of its objects to provide hydraulic means responsive to the rate of movement of a movable part of a machine, such as the spindle of a turret lathe, to control the actuation of the associated mechanism, such as a spindle brake and/or a rate changing mechanism.

Another object of the invention resides in the provision of automatic means responsive to the rate of movement of a movable part of a machine for controlling the actuation of associated mechanisms.

A further object of the invention consists in the provision of centrifugally operated means for actuating one or more associated mechanisms in response to the rate of movement of a movable part of a machine tool.

Another object consists in the provision of a centrifugal valve in a hydraulic control system of a machine tool, said valve being responsive to variations in the rate of movement of a movable part of a machine tool to selectively actuate one of a plurality of control mechanisms of a machine tool.

Another object of the invention is an hydraulic system associated with an operative mechanism and having a control valve responsive to the rate of movement of a part of said mechanism whereby to actuate a brake mechanism for slowing down said part preparatory to effecting a change of rate in said part.

Another object of the invention is an hydraulic system associated with an operative mechanism and having a control valve responsive to the rate of movement of a part of said mechanism whereby to actuate a brake mechanism for slowing down said part preparatory to effecting a change of rate in said part and to thereby respond to the reduced rate to effect said change of rate.

A further object of the invention is to provide in a machine tool having a movable part, means for moving the part at any one of a plurality of selected or preselected rates, a brake for slowing down or stopping said part preparatory to effecting a rate change, a means responsive to the rate of movement of said part for actuating the brake or effecting a rate change, and a single control movable to disengage the drive to said movable part and then to actuate said rate responsive means.

A still further object of the invention is to provide a centrifugally operated valve responsive to the rate of movement of the movable part of a machine tool for automatically actuating an associated brake, or a rate changing means, and to further provide a single control means for first disengaging the drive to the movable part and then movable to supply fluid under pressure to said centrifugal valve.

Other objects and advantages of the invention will become more apparent as the following description of an embodiment thereof progresses reference being made to the accompanying drawings in which like reference characters are employed to designate like parts throughout the same.

Figure 1:
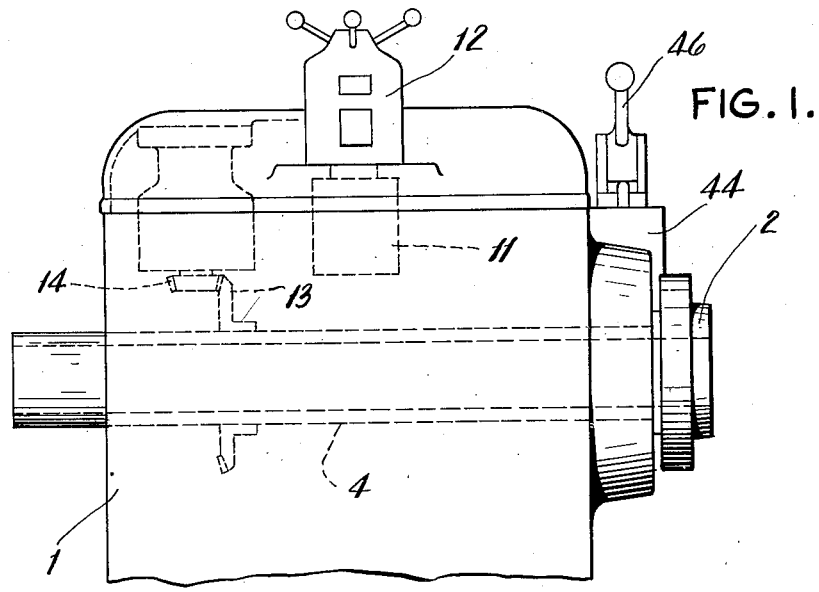
Figure 1 is a side elevation of the head stock of a turret lathe illustrating one application of my invention.
Figure 2:
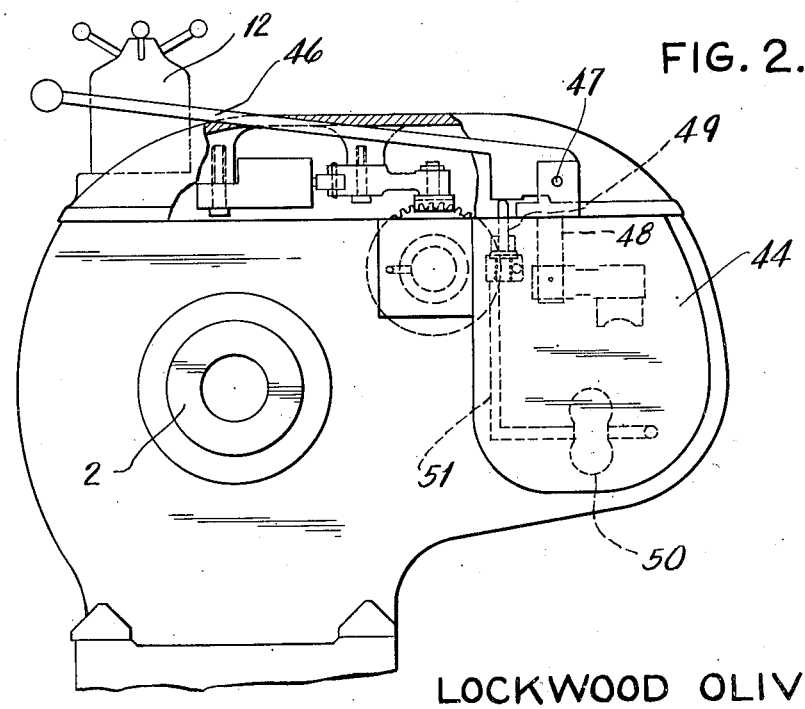
Figure 2 is a front end view of the head stock shown in Figure 1.

Figure 6 is a diagrammatic view showing an hydraulic system including a selector or preselector valve and one of a plurality of associated gear shifting units, an hydraulic brake, a control valve and a valve responsive to the rate of movement of a driven member for actuating the brake or selected gear shifting units through the selector or preselector valve when fluid under pressure is delivered to said rate responsive valve.

Referring now more particularly to the drawings, the embodiment illustrated therein may be described as follows, although it will be understood that certain departures from the form shown may be made without departing from the spirit or scope of the invention.

The invention is shown in the drawings as applied to a machine tool such as a turret lathe, but it is within the intent and purposes of the invention to use the same with other types of machine tools and control systems therefor, or to use the same in conjunction with any machine having a plurality of units adapted to control the movement of a movable part of the machine.

Figure 3:
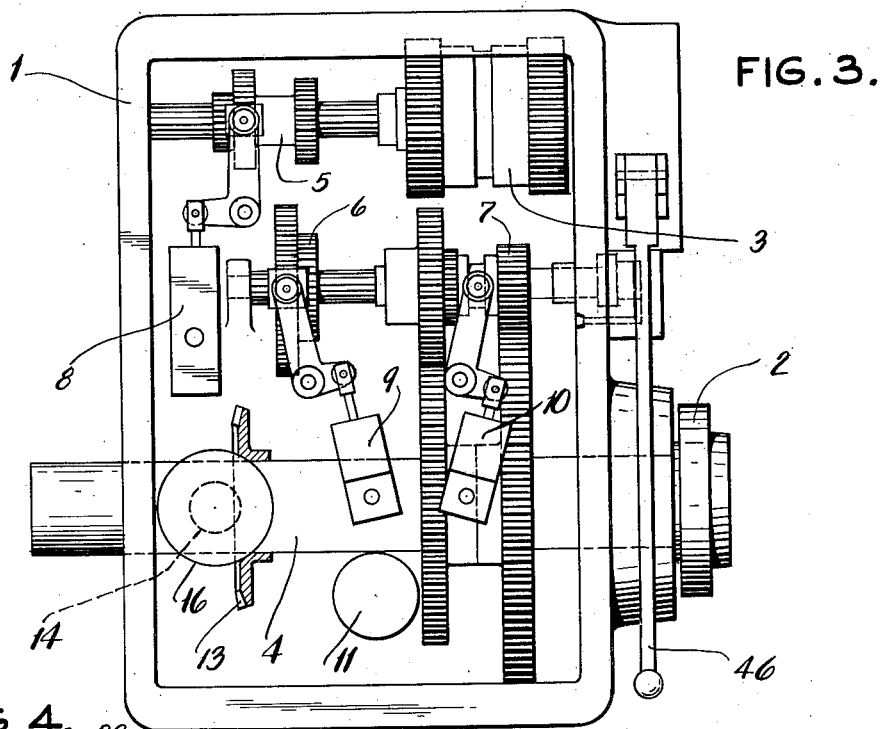
Figure 3 is a top view of the head stock with the cover removed showing a selective speed transmission for driving the lathe spindle together with a drive connection from the spindle shaft for operating a centrifugal valve forming a part of this invention.

In the present application of the invention, a head stock is shown at 1, there being a spindle 2 driven at selected or preselected rates through a selective gear transmission which is housed within the casing of the head stock and which is shown more in detail in Figure 3. Associated with the transmission is the usual forward and reverse clutch mechanism indicated at 3. The operation of the clutch may be manual or automatic through conventional control means.

In Figure 3, the spindle shaft 4 is driven through the selective gearing of the transmission, there being shown for purposes of illustration only several gear clusters indicated at 5, 6 and 7. This hydraulically operated transmission may be of the form such as shown in the Letters Patent to Oskar Kylin and Henrik O. Kylin No. 2,279,710 issued April 14, 1940. Each of the clusters 5, 6 and 7 is hydraulically operated from a cylinder and piston 8, 9 and 10 respectively, and each cylinder is hydraulically connected with a selector or preselector distributing valve indicated diagrammatically at 11. This valve is adapted to be manually operated to select or preselect the gear ratios through a rotating head 12 having suitable indicating means for selecting and preselecting the desired rates of rotation to be imparted to the spindle shaft through the selective transmission. These parts are shown in the drawings only in diagrammatic form since they do not, in themselves, constitute the present invention, but merely serve to illustrate the application of the invention.

A bevel gear 13 fixed to the spindle shaft 4 is in constant mesh with a bevel pinion gear 14 locked on the lower end of the valve shaft 15, and drives the shaft 15.

Figure 4:
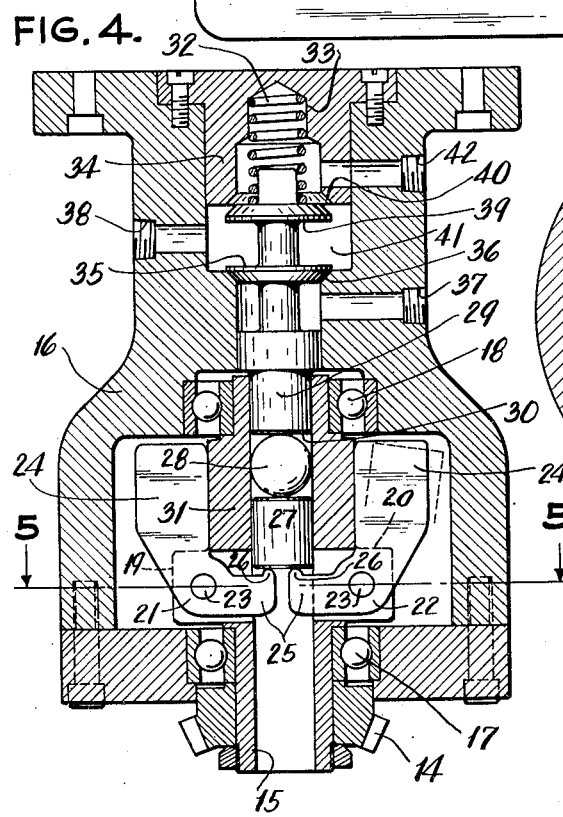
Figure 4 is a vertical central section through a centrifugally operated valve embodying the present invention.
Figure 5:
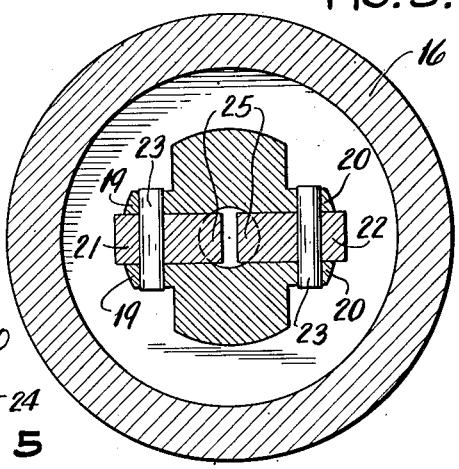
Figure 5 is a section taken on line 5—5 of Figure 4.

The valve shaft 15 is tubular and is mounted in the valve casing 16 to rotate in the bearings 17 and 18, and is formed with outwardly extending pairs of spaced bosses 19 and 20 between which the centrifugal valve actuating fingers 21 and 22 are pivotally supported respectively at 23. These fingers comprise an upper weighted portion 24 and an inwardly extending portion 25. The arms 25 terminate along their upper edge in a rib or projection 26 upon which rests the plunger 27. A ball bearing 28 is interposed between the upper flat surface of the plunger 27 and the lower flat surface of the valve stem 29 at 30 to permit the rotor 31 together with its assembly of centrifugal fingers 21 and 22 to rotate within the casing independently of the valve stem 29. In order that the valve stem 29 may at all times be urged into bearing engagement with the ball 28 I have provided a compression spring 32 seated in a recess 33 formed in the removable member 34, and exerting a downward force of compression on the valve stem 29. The force of the spring 32 is sufficient, that when the spindle shaft 2 is at rest or is even rotating at a preselected relatively slow rate, the lower valve 35 will be seated in its seat 36 to thereby shut off the outlet 37 from communication with the pressure fluid inlet 38. In this position, of course, the upper valve 39 will be unseated to deliver fluid to duct 42. However, when the rate of rotation of the spindle shaft 2 is increased sufficiently that the centrifugal forces set up in the rotating fingers 24 cause them to swing outwardly toward the casing 16 as shown in dotted lines in Figure 4, the arms 25 will press the plunger 27 upwardly in the hollow shaft 15 to lift the valve stem 29 overcoming the compression of the spring 32. In this position the valve 35 will be unseated while the upper valve 39 will be closed on its seat 40. With the valves in this position, due to the rotation of the rotor 31 in response to a relatively high spindle rate, fluid under pressure will be communicated from the port 38 and chamber 41, past valve 35 and into conduit 37, while fluid under pressure will be denied communication with port 42 and conduit 43.

In order to better understand the formation of the centrifugally operated valve when employed as a means to automatically control the operation of certain elements of a turret lathe as illustrated in the drawings, upon the operation of a master control member, particular reference may be had to Figures 1, 2, 3 and 6.

In these figures, the head stock of a turret lathe is shown at 44 and houses the spindle shaft 4, the selective transmission gearing illustrated in Figure 3, the centrifugal valve 16, the spindle brake 45 and the preselector distributing valve 11.

A single manually operated control lever 46 operable about intersecting axes is mounted on the head stock for vertical movement about the axis 47 and for horizontal movement about an axis indicated at 48. The lever 46 may be swung about its vertical axis to perform certain step by step functions such as clutching and unclutching in forward or reverse spindle drive as disclosed in Letters Patent No. 2,279,710 above referred to, and at a predetermined neutral position may be depressed about its horizontal axis to open the control valve 49 and admit fluid pressure from the pump 50 and conduit 51 to the conduit 38 which communicates with the interior of the centrifugally operated valve 16 as shown more clearly in Figure 4.

The hydraulic brake 45 operates to slow down or stop the idling spindle shaft through suitable gearing (not shown) between gear shifting operations. This brake is of conventional design having cooperating friction plates keyed to the shaft 52 and alternate plates keyed or secured to the casing 53. The plunger or piston 54 operates in a brake cylinder 55 which communicates through the duct 56 with the conduit 37.

It will be seen from the foregoing that the present invention provides an automatic selective means responsive to the rate of movement of a movable part of a machine tool, whereby one or the other of several control means such as a means for braking the spindle shaft or means for selectively distributing fluid under pressure to obtain any one of a number of available gear ratios in the transmission, may be selectively operated in response to the speed of the spindle shaft.

More particularly, assuming that the spindle shaft is rotating at a relatively high speed and the next preselected or selected speed for a subsequent lathe operation is to be relatively slow, as determined by the position of the preselector valve 11, the operator by moving the lever 46 from one extreme limit of motion about its vertical axis, will first unclutch the transmission. As the lever in its swing reaches an intermediate or gear idling position, it may be depressed to open the control valve 49 and thus admit fluid under pressure to the chamber 41 of the centrifugally operated valve 16. Since the spindle shaft will be idling at a relatively high rate of rotation, the valve shaft 15 driven from the spindle shaft will also be rotating at a high rate. Centrifugal forces set up in the rotating fingers 24 will, of course, cause them to assume an outward or dotted line position in Figure 4. Thus the valve shaft 29 will be raised to close valve 39 and to open valve 35 in response to this relatively high rate of rotation of the spindle shaft. The effect of opening valve 35 is to admit fluid pressure through the conduit 37 to the hydraulic brake shown diagrammatically in Figure 6, and thereby apply a braking action to the spindle shaft to stop or slow it down. Slowing down of the spindle shaft in turn slows down the valve shaft 15 and reduces the centrifugal forces operating to spread the fingers 24 outwardly until the compression of the spring 33 and the weight of the valves 39 and 35, the stem 29 and the parts 27, 28 and 29 is sufficient to return the valve 35 to its seat 36 and to open valve 39. When valve 39 is open fluid pressure is then transmitted through the port 42 and conduit 43 to the selector or preselector valve 11 from which it is distributed to the several gear cluster unit 8, 9 and 10 to select the desired gear ratios available in the transmission.

After the gears have been shifted in accordance with the selection made, the operator releases the lever 46 from its depressed position and returns the lever to its original or clutching position to drive the spindle shaft at that selected rate.

As disclosed in the Letters Patent above referred to the lever 16 may be moved to its other extreme position to obtain any selected gear ratio to drive the spindle in reverse.

When selecting a spindle speed which is considerably higher than a low speed at which the spindle is operating, the valve 35 will be closed while the valve 39 will be open. In this manner the operator may go directly into the relatively high speed selection without the necessity of braking the idling spindle between shifts.

It will be seen from the foregoing that the present invention not only contemplates a form of centrifugally operated valve but also includes the combination of such a valve responsive to the rates of rotation of a movable part of a machine tool such as a spindle to select the operation of one or more devices controlling the movement of the movable part, with a single lever control to admit fluid pressure to the valve while the spindle or movable part is idling or at rest.

Various changes may be made in the details of construction and arrangement of parts without departing from the spirit of the invention or the scope of the appended claims.

I claim:

1. In a machine tool having a movable part, means including a source of power for moving said part at any one of a plurality of selected and preselected rates, a single control member, a brake for slowing up said movable part preparatory to a rate change in said part, and means responsive to the rate of movement of said part and operable in response to an actuation of the control member to first control the movement of said part when said part is moving at or above a predetermined rate and then operable to control a rate change in said part.

2. In a machine tool having a movable part, means including a source of power for moving said part at any one of a plurality of selected and preselected rates, a single control member, a brake for slowing up said movable part preparatory to a rate change in said part, and centrifugally operated means operable in response to an actuation of the control member to first control the movement of said part when said part is moving at or above a predetermined rate and then operable to control a rate change in said part.

3. In a machine tool having a movable part, the combination with means including a source of power for moving said part at selected and preselected rates, of a brake for said part, a single control member, an hydraulic system interconnecting said means and said brake, and a centrifugally operated valve in said system and responsive in its operation to the rate of movement of said part, said control member being operable to complete or disrupt said hydraulic system through said valve.

4. In a machine tool having a movable part, a source of power for moving said part, a change speed device for moving said part at preselected rates, a brake for said movable part, control means movable to effect an actuation of said brake, and centrifugally operated means responsive to the rate of movement of said part for rendering said brake operative upon said part and then to effect a rate change for said part.

5. In a machine tool having a movable part, the combination with means for moving said part at preselected rates and a source of power for driving said part, of a brake for the movable part, centrifugally operated means responsive to the rate of movement of said part for controlling said brake and effecting a rate change for said part, a second source of power for operating said brake, and a control means connected with said second power source and said centrifugally operated means.

6. In a machine tool having a driven part, the combination with means for moving said part at selected and preselected rates, of a brake for said part, means for selecting and preselecting the rate of movement of said part, means for effecting a rate change in said part, centrifugally operated means responsive to the rate of movement of said part for controlling said brake and said rate change means, a source of power for operating said brake and said rate change means, and control means connected with said power source and with said centrifugal means.

7. In a machine tool having a movable part, the combination with means including a source of power for moving said part at selected and preselected rates, of a brake for said movable part, means for selecting and preselecting the rate of movement of said part, centrifugally operated means responsive to the rate of movement of said part for rendering said brake operative on said part prior to a rate change and then effective to change the rate of movement of said part, and control means cooperating with said centrifugal means.

8. In a mechanism having a movable part, a source of power for moving said part, a brake for said part, means for selecting the rate of movement for said parts, means for shifting from one of said rates to another, and centrifugally operated means responsive to the rate of movement of said part for controlling said brake and the shifting means.

9. In a machine tool having a driven part, the combination with means for driving said part at any one of a plurality of preselected rates, means for pre-selecting the part rates and means for effecting said rate changes, of a brake for slowing up said part preparatory to a rate change in said part, a centrifugally operated valve responsive to the rate of movement of said part for controlling said brake and said driven rate change means, a fluid pressure system having connection with said valve, brake, pre-selecting means and said rate change means, and a control valve in said system operable to control the admission of fluid pressure to said first named valve.

10. In a machine tool having a driven part, the combination with means for driving said part at any one of a plurality of preselected rates, means for pre-selecting the part rates and means for effecting said rate changes, of a brake for slowing up said part preparatory to a rate change in said part, a centrifugally operated valve responsive to the rate of movement of said part for controlling said brake and said driven rate change means, a fluid pressure system having connection with said valve, brake, pre-selecting means and said rate change means, and a control valve in said system operable to control the admission of fluid pressure to said first named valve, said centrifugally operated valve being operable in response to an actuation of said control valve to first slow the movement of said part when said part is moving at or above a predetermined rate and then operable to control a rate change in said part.

LOCKWOOD OLIVER.

REFERENCES CITED

The following references are of record in the file of this patent:

UNITED STATES PATENTS

| Number | Name | Date |
|---|---|---|
| 900,671 | Debauche | Oct. 6, 1908 |
| 1,579,206 | Boe | Apr. 6, 1926 |
| 1,634,149 | Klausmeyer | June 28, 1927 |
| 1,799,392 | Rhys | Apr. 7, 1931 |
| 1,976,368 | Parsons | Oct. 9, 1934 |
| 2,003,857 | Hale | June 4, 1935 |
| 2,115,097 | Durham | Apr. 26, 1938 |
| 2,148,326 | Siekmann | Feb. 21, 1939 |
| 2,166,029 | Vorech | July 11, 1939 |
| 2,174,292 | Rich | Sept. 26, 1939 |
| 2,248,363 | Kuenhold | July 8, 1941 |
| 2,312,433 | Meyer | Mar. 2, 1943 |
| 2,313,438 | Hoelscher | Mar. 9, 1943 |